(12) United States Patent
Bryer et al.

(10) Patent No.: US 10,801,208 B1
(45) Date of Patent: Oct. 13, 2020

(54) WATER DIVERTING AND FILTERING DEVICE FOR RAIN GUTTERS

(71) Applicants: Slate E. Bryer, Rocklin, CA (US); Christopher G. Tatasciore, Loomis, CA (US)

(72) Inventors: Slate E. Bryer, Rocklin, CA (US); Christopher G. Tatasciore, Loomis, CA (US)

(*) Notice: Subject to any disclaimer, the term of this patent is extended or adjusted under 35 U.S.C. 154(b) by 0 days.

(21) Appl. No.: 16/353,749

(22) Filed: Mar. 14, 2019

Related U.S. Application Data

(60) Provisional application No. 62/642,715, filed on Mar. 14, 2018.

(51) Int. Cl.
*E04D 13/076* (2006.01)
*B01D 29/44* (2006.01)

(52) U.S. Cl.
CPC ........... *E04D 13/076* (2013.01); *B01D 29/44* (2013.01)

(58) Field of Classification Search
CPC .............. E04D 13/0767; E04D 13/068; E04D 13/0413
See application file for complete search history.

(56) References Cited

U.S. PATENT DOCUMENTS

| | | | | |
|---|---|---|---|---|
| 2,583,422 A * | 1/1952 | Haddon | ................ | E04D 13/076 210/498 |
| 4,418,504 A * | 12/1983 | Lassiter | ................ | E04D 13/076 210/474 |
| 4,727,689 A * | 3/1988 | Bosler | ................... | E04D 13/076 52/11 |
| 4,959,932 A * | 10/1990 | Pfeifer | .................. | E04D 13/076 52/12 |
| 5,010,696 A * | 4/1991 | Knittel | .................. | E04D 13/076 210/474 |
| 5,109,640 A * | 5/1992 | Creson | .................. | E04D 13/076 210/474 |
| 5,271,191 A * | 12/1993 | Vahamaki | ............. | E04D 13/076 210/474 |
| 5,729,931 A * | 3/1998 | Wade | .................... | E04D 13/076 248/48.2 |
| 8,375,644 B2 * | 2/2013 | Robins | .................. | E04D 13/076 52/12 |
| 9,021,747 B2 | 5/2015 | Lenney et al. | | |
| 9,284,735 B2 | 3/2016 | Bryer et al. | | |
| 10,125,496 B2 * | 11/2018 | Lenney | ................. | E04D 13/076 |

(Continued)

*Primary Examiner* — Paola Agudelo
(74) *Attorney, Agent, or Firm* — John P. Costello; Costello Law Corp.

(57) ABSTRACT

A gutter guard filtering device built to cover the top of a rainwater gutter opening. The gutter guard filtering device is comprised of an extruded rigid metal or rigid plastic support frame that supports a separate filtering media assembly and a separate rear wing assembly where the filtering media is comprised of a pachinko-style filtering media design or a continuous bead-style filtering media and the rear wing is a sheet metal rear wing assembly. The main body frame contains both front and rear receivers that hold the filtering media, that hold the wing assembly, or hold both filter filtering media and wing together in such a manner as the receivers contain serrations, bosses, or protrusions on the surfaces that come in contact with the filtering media and/or wing assembly in a tongue and groove configuration.

23 Claims, 7 Drawing Sheets

(56) References Cited

U.S. PATENT DOCUMENTS

| | | | |
|---|---|---|---|
| 2007/0234647 A1* | 10/2007 | Higginbotham | E04D 13/076 52/12 |
| 2011/0138698 A1* | 6/2011 | Neumann | E04D 13/076 52/12 |
| 2011/0283630 A1* | 11/2011 | Beckham | E04D 13/0725 52/12 |
| 2012/0144759 A1* | 6/2012 | Higginbotham | B01D 69/10 52/12 |
| 2015/0040488 A1* | 2/2015 | Lenney | E04B 1/92 52/12 |
| 2017/0022714 A1* | 1/2017 | Bryer | E04D 13/076 |
| 2018/0030733 A1* | 2/2018 | Brochu | E04D 13/076 |

* cited by examiner

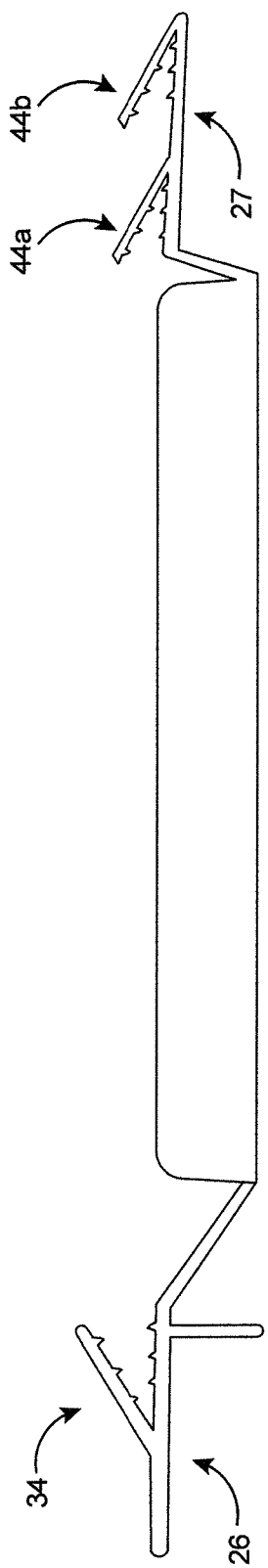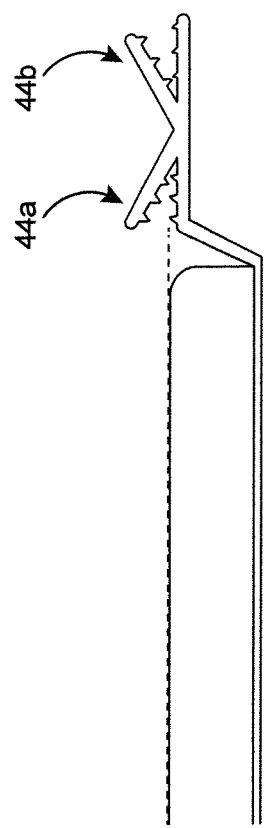

WATER DIVERTING AND FILTERING DEVICE FOR RAIN GUTTERS

CROSS-REFERENCE TO RELATED APPLICATIONS

This application claims the benefit of U.S. Provisional Patent Application No. 62/642,715, filed on Mar. 14, 2018.

BACKGROUND OF THE DISCLOSURE

Technical Field of the Disclosure

This invention relates to gutter guard products which employ a wire mesh filtration screen, and more particularly, relates to methods and devices to hold a wire mesh screen to a supporting frame, as well as patterns formed into the wire mesh screen which serve to slow down and divert water contacting the wire mesh filtration screen.

Description of the Related Art

U.S. Pat. No. 9,021,747 issued to Lenney ("'747 Patent") describes a gutter guard system which has a corrugated wire mesh filtration screen. The filtration screen is embossed with corrugations which extend from the upper edge to the lower edge of the screen. The '747 Patent has the corrugated upper edge and lower edge of the screen fitting into recesses of upper and lower supports. However, while a corrugated wire mesh filtration screen with corrugations oriented perpendicular to the long axis of the gutter as described in the '747 Patent is good for imparting strength to the gutter guard system, it does very little to slow down the flow of water over the screen and alternate method of slowing down or diverting the water such as imparting dips in the screen or applying beads of caulk beneath the screen are used with this design The inventors, in their U.S. Pat. No. 9,284,735 introduced the concept of using a wire mesh filtration screen with ridges extending between an upper and a lower support, the ridges being sinusoidal or S-shaped. These S-shaped ridges served to slow down the flow of water and divert it into the gutter very early in its travel across the screen.

The inventors believe that screen patterns having designs directed toward breaking up water flow as it travels across the screen has significant merit. The present invention seeks to do this as one of its objectives.

SUMMARY OF THE DISCLOSURE

The inventions described herein are directed toward improving gutter guards in general. In one aspect of the invention, the use of mesh filtration screen patterns having designs directed toward breaking up water flow is achieved by two main screen patterns. A first pattern is a "pachinko-style" pattern, which is named after Japanese arcade games popular in the 1970s, where metallic balls traveled in a broken zig-zag pattern. The mesh filtration screen of the inventive gutter guard has patterns which [are] cause water to travel in a similar broken zig-zag pattern as it runs down the slope of the screen, thus slowing and breaking up the water flow. A second pattern will be referred to herein as a continuous bead pattern, which is a staggered, but not broken zig-zag pattern or a staggered but not broken pattern style of raised pattern or shape.

Further, the invention is also a set of receivers for receiving the upper and lower mesh filtration screen edges and crimping them in such a way that the screen edges are held fast in the receivers while minimizing the potential for debris pockets forming at the junction where the screen meets the receivers.

BRIEF DESCRIPTION OF THE DRAWINGS

FIG. 5 is a side view of the solid support frame showing the rear support with forward facing separate receivers for filter screen and wing assembly, FIG. 6 is a side closeup view of the rear support with opposite facing separate receivers for filter screen and wing assembly.

DETAILED DESCRIPTION OF THE INVENTION

Figure 1:
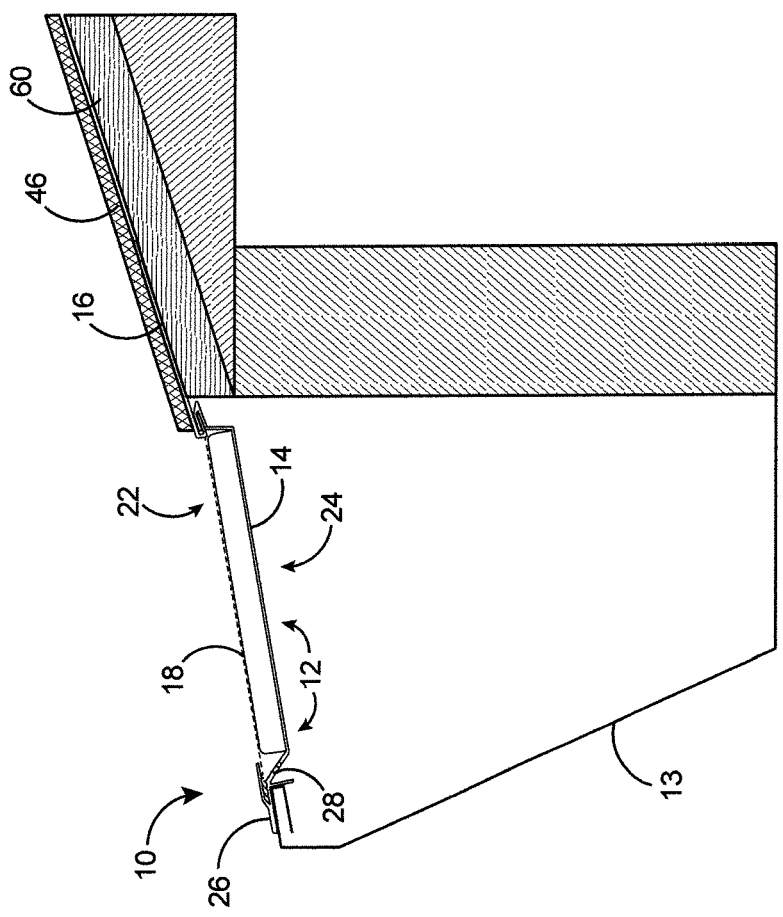
FIG. 1 is a side view of the whole inventive gutter guard assembly, installed on a gutter attached to a roof eave.

Referring to FIG. 1, a gutter guard filtering device 10 built to cover the top of a rain water gutter opening 12 of gutter 13 may be accomplished in the following manner: The gutter guard filtering device 10 is comprised of three components consisting of an extruded rigid metal or plastic support frame 14, a separate rear wing assembly 16, and a filtering media 18 comprised of a pachinko-style screen design or a continuous bead-style design.

The gutter guard 10 is a three-piece system containing a two-piece frame system consisting of a rigid frame support 14 being extruded of metal or plastic and an attached separate rear wing assembly 16 made from a bendable/formable sheet metal. No other gutter guard currently has a rigid extruded frame with a separate bendable wing assembly in order to allow the wing to conform better to a roof slope for under roof mounting and also allow for a bent wing configuration for fascia mounting, all the while allowing for a single rigid frame component for manufacturing simplicity and lower costs while having a rigid structure to resist heavy objects when installed.

Figure 2:
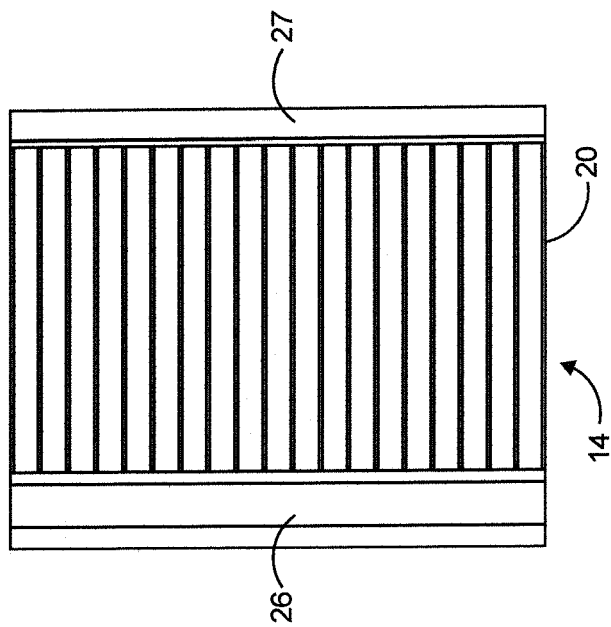
FIG. 2 is a top plan view of the extruded solid support frame.

Referring to FIG. 2, the rigid support frame 14 has vertical raised support edges 20 from the top 22 to bottom 24 in a non-horizontal direction to the front support 26 which supports the filtering media 18 without the use of a floor therefore eliminating the retention of water and debris that can cause mold and moss, and also eliminates the restriction of water inherent in current extruded frames on the market today.

Adjacent the front support 26 is an angled portion 28 angled at between 30 and 60 degrees from the top 22 of the frame support 14 and below the plane of the filtering media 18 to bottom 24 of frame support 14 to eliminate the pooling of water, because on current designs the traditional flat surface will cause the water to build up and push back through the screen and over the top causing dripping, hence angled portion 28 allows the water to not pool, and this angled portion may or may not have holes either punched or drilled to further reduce the push back effect of water and stop the dripping issue.

Figure 3:
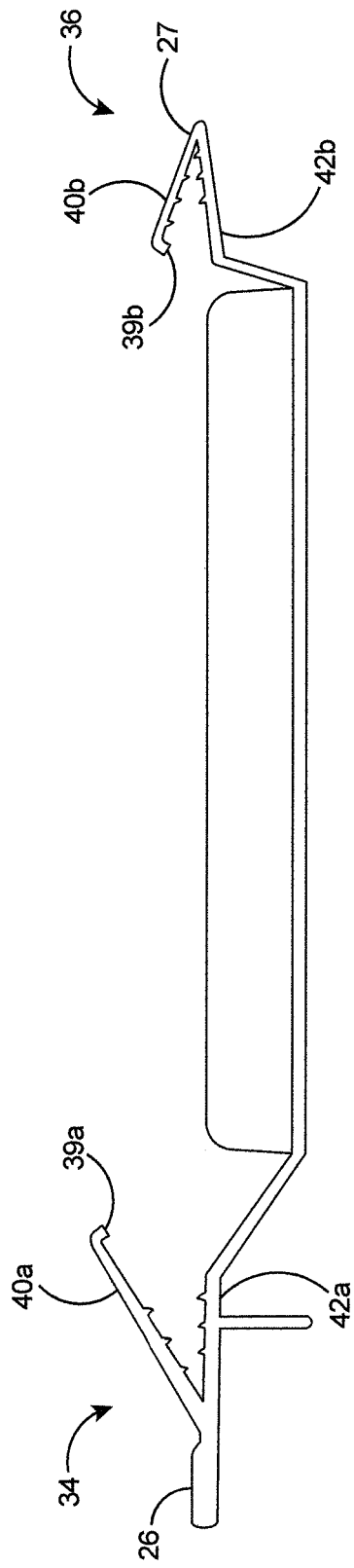
FIG. 3 is a side view of an extruded solid support frame of the inventive gutter guard, with angled rear wing receiver angled upward from the frame support.
Figure 4:
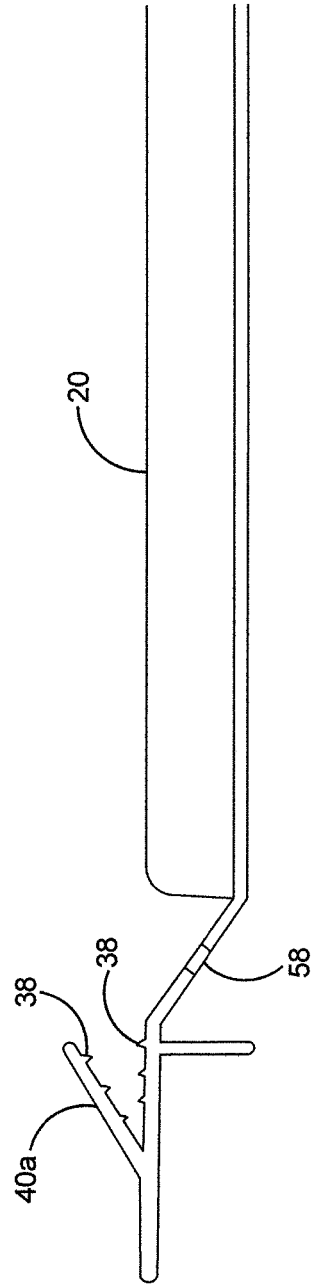
FIG. 4 is a closeup side view of the front support, with receivers containing serrations.
Figure 8:
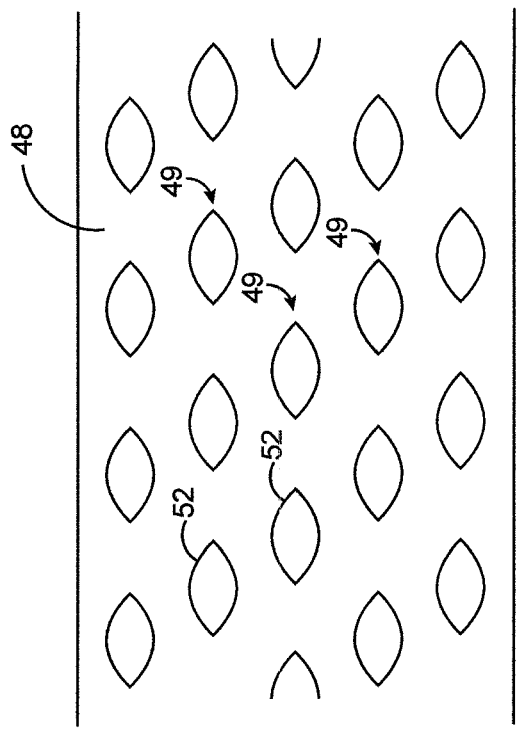
FIG. 8 is the inventive pachinko-style screen, design 2.
Figure 7:
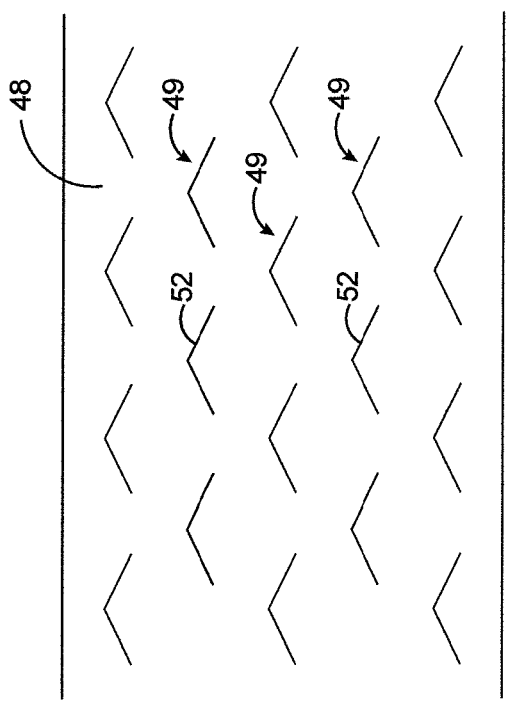
FIG. 7 is the inventive pachinko-style screen, design 1.
Figure 10:
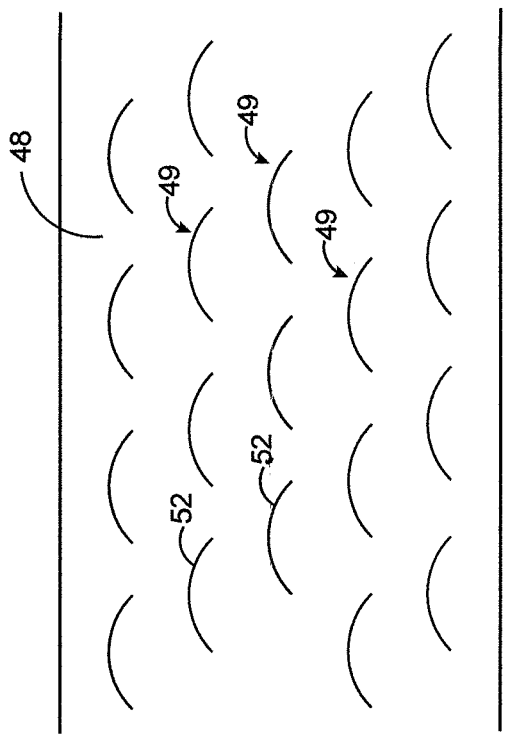
FIG. 10 is the inventive pachinko-style screen, design 4.
Figure 9:
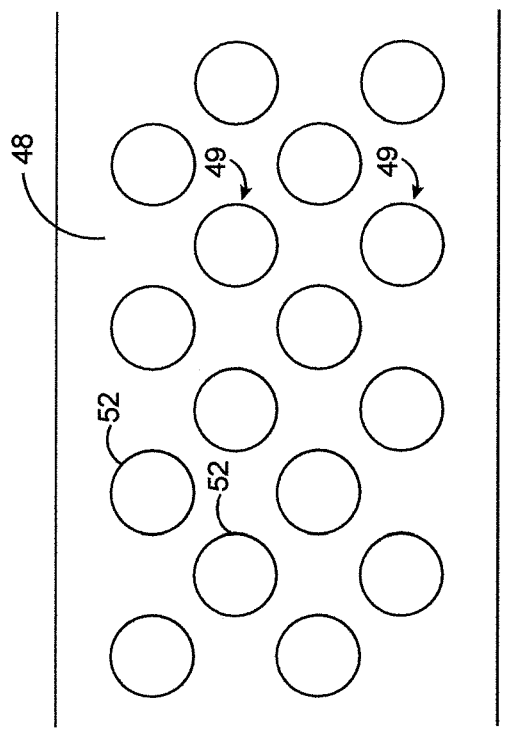
FIG. 9 is the inventive pachinko-style screen, design 3.
Figure 12:
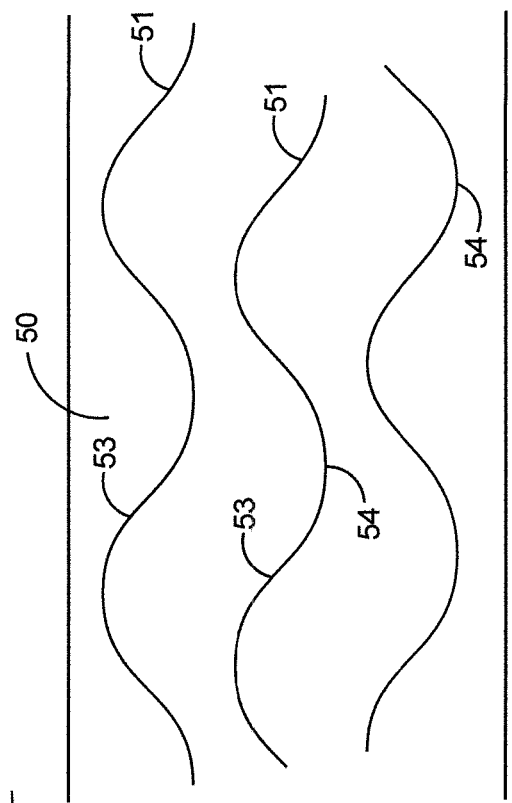
FIG. 12 is the inventive continuous bead-style screen, design 2.
Figure 11:
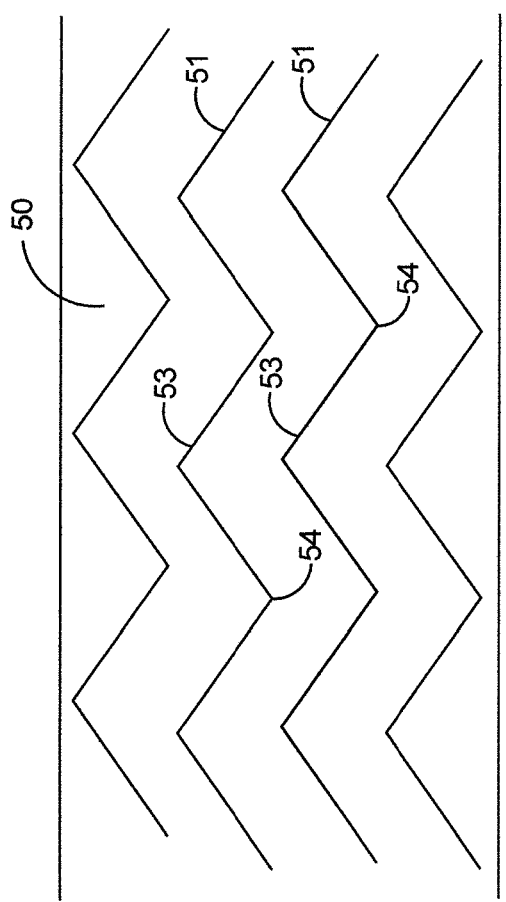
FIG. 11 is the inventive continuous bead-style screen, design 1.
Figure 13:
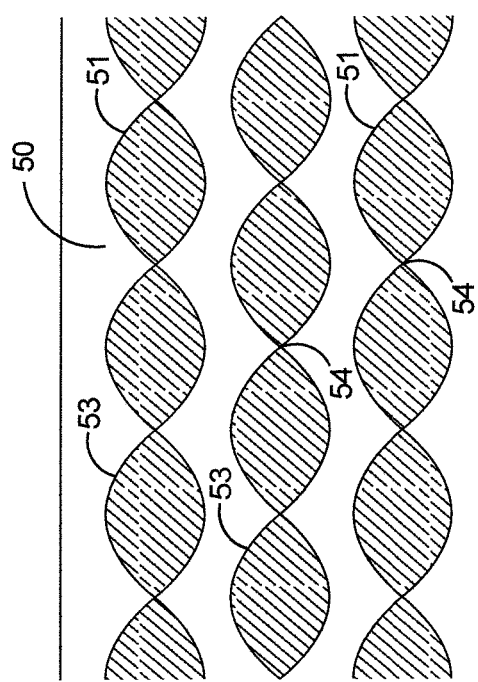
FIG. 13 is the inventive continuous bead-style screen, design 3.
Figure 14:
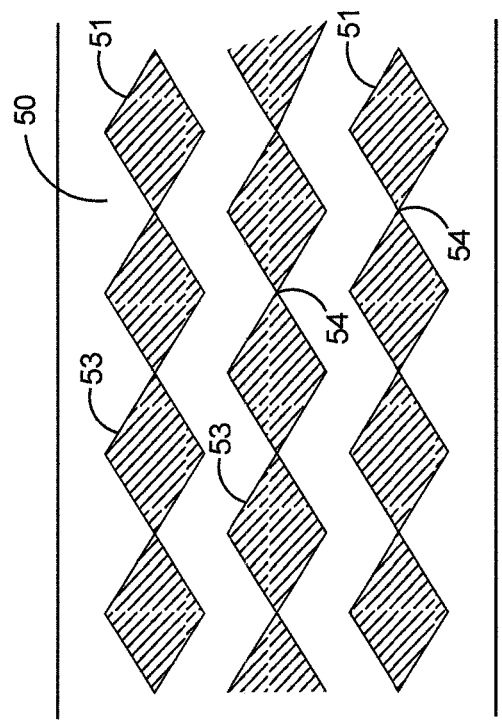
FIG. 14 is the inventive continuous bead-style screen, design 4.

Referring further to FIGS. 3 and 4, the support frame has receivers 34, 36 to attach the filtering media that contains one or more serrations, bosses, or protrusions 38 located on the inside top leg 40*a*, 40*b* and/or inside bottom leg 42*a*, 42*b* of the receivers 34, 36 which are used to grip the filtering media 18 preventing it from pulling out of the frame, because current designs on the market have filtering media that pull out due to ice effects, heavy debris impacts, and heat and cooling contractions when installed.

Any of the top legs 40*a*, 40*b* of the receivers 34, 36 ether front or rear contain a serration, boss, or protrusion 39*a*, 39*b* located on the horizontal edge of each receiver that is oriented downward toward the bottom 24 of the rigid support frame 14 and contacts the filtering media 18 or wing assembly 16 when closed eliminating the gap between the receiver 34, 36 and the filtering media 18 or wing assembly 16 which prevents debris from catching the gap, which is an ongoing problem on current designs in the market today. The device has top 36 and bottom 34 receivers containing serrations, bosses, or protrusions 38 oriented in a tongue and groove manner when the receivers are closed that aid in the better gripping of the filtering media to resist the pulling of the media from the frame and also aid in the gripping of the rear wing assembly 16 to resist separation due to installation pressures and heat & cold contraction when installed.

The front support 26 has a receiver 34 that when closed the top leg 40*a* of receiver 34 protrudes out over the filtering media 18 between ⅛" to 7/16" beyond the bottom leg 42*a* of receiver which is intended to block water from under the filtering media 18 pushing back up through the filtering media 18 therefore reducing dripping effects which are common on current designs on the market today.

Referring now to FIGS. 5 and 6 the rear frame support 27 has receivers 44*a*, 44*b* to attach the filter screen 18 and/or the wing assembly 16 where there are one or more receivers 44*a*, 44*b* on the rear support 27, such that one receiver 44*a* is to hold the filter screen 18 and one receiver 44*b* is to hold the rear wing assembly 16, or there is one receiver 36 to hold both the filter screen 18 and the rear wing assembly 16, where the two-receiver configuration 44*a*, 44*b* can be forward-facing or be opposite-facing.

The rear receiver 36 attaching the wing assembly 16 when closed is angled between 4 degrees to 31 degrees upward from the frame support 14 where the wing 16 is attached to better position it to match the roof slope while keeping the rigid frame support 14 and filtering media 18 at the ideal angle, where current designs on the market do not angle the frame which causes the lifting of the roof shingle 46 or resulting in a non-ideal angle of the filtering media 18.

There are two filter media designs, one being referred to as pachinko-style, seen in FIGS. 7-10 and the other referred to as continuous bead-style, seen in FIGS. 11-14. The filter material 18 referred to as a pachinko-style filtering media design 48 is a staggered and broken zig-zag style or a staggered and broken pattern style of raised pattern or shape 49. The filter material 18 referred to as a continuous bead-style filtering media design 50 is a staggered but not broken zig-zag style or a staggered but not broken pattern style of raised pattern or shape 51. In both these designs 48, 50 the rainwater flow is redirected from side to side and being forced to hit the raised media edge 52, 53 multiple times which slows the water velocity down and breaks the water surface tension better than any current design on the market today. Current raised screen patterns on the market may have a raised screen, but those designs can have the waterflow follow those raised patterns due to surface tension adhesion since those patterns do not have a stop and start break in them like the pachinko-style 48 or continuous bead-style 50 does. Those current patterns allow for water to follow the filtering media and flow over the appliance instead of the water going through the filtering media and into the gutter. The pachinko design 48 forces water from side to side while also forcing the water to hit the raised media edge 52 of the pattern 49 forcing the water through filtering media 18, then by virtue of the broken patterns, the remaining water flows to the next off-set raised pattern 49 to again hit the raised media edge of the pattern 49 and forcing the water from side to side which allows more water to better fall through the filtering media 18. The continuous bead pattern design 50 forces water side to side into focal point 54 and the water is either diverted through the filtering media 18 or up and over the raised focal point 54 to flow and hit the lower off-set raised continuous bead pattern shape 51 again forcing the water to hit, move, and go through the filtering media 18 into the gutter 13. The pachinko-style 48 and continuous bead-style 50 patterns both make the water go through the filtering media 18 and continues to adhere to the underside of the filtering media 18 due to water surface tension fall off the underside of the filtering media due to the breaks, called drop gaps (not shown), in the underside of the filtering media caused by the formation of the pachinko-style 48 or continuous bead-style 50 patterns on the top of the filtering media 18 which allows for this water to fall off the filtering media 18 into the gutter 13. Current designs use a bead of caulking on the underside of the filtering media to perform this water fall off or use a v-bend in the filter media itself to perform this fall off, but both these current designs are flawed as the v-bend captures debris which then causes a debris bridge over the filtering media resulting in water going over front of the gutter guard and dripping, while the bead of caulking on the underside of the filtering media adds cost in manufacturing and can peel off the filtering media over time and stop working. Both the pachinko-style and the continuous bead-style solve these issues.

In the preferred embodiment the gutter guard 10 is comprised of a rigid support 14 extruded from metal or plastic supporting a filtering media 18 with an attached separate rear wing assembly 16 that is bendable and formable. The front support 26 is preferably angled at between 30 and 60 degrees and has holes 58 for additional drainage if the gutter guard device 10 is installed on a highly pitched roof 60.

The support frame has receivers 34, 36 to attach the filtering media 18 that contain one or more serrations, bosses, or protrusions 38 located on the inside top leg 40*a*, 40*b* and/or inside bottom leg 42*a*, 42*b* of the receivers, and the top leg 40*a* shall preferably contain an end-like serration, boss, or protrusion 39*a*, 39*b* that is oriented downward toward the rigid support frame 14 and contacts the filtering media 18 when closed. This could hold the screen tight and keep debris out of the gap between the filtering media 18 and receiver connection areas. Additionally, the top legs 40*a*, 40*b* and bottom legs 42*a*, 42*b* of receivers 34, 36 containing serrations, bosses, or protrusions shall be oriented in a tongue and groove manner when the receivers 34, 36 are closed to provide more grip function and to not bind or interfere with other serrations, bosses, or protrusions. The front support receiver 34 when closed shall have the top leg 40*a* protrude out over the filtering media 18 between ⅛" to ⁷⁄₁₆" beyond the bottom leg 42*a* like a shelf or awning or ledge which acts to block water from uprising below due to surface tension or pushing due to waterflow. The rear support 27 has a single receiver 36 that attaches the filtering media 18 that contain one or more serrations, bosses, or protrusions, 38 on the top leg 40*b* or bottom leg 42*b*. The single receiver 36 can attach both the filtering media 18 and the rear wing assembly 16. In additional embodiments, rather than a single rear receiver 36, the rear support 27 can have twin receivers 44*a*, 44*b*, to hold the filtering media 18 and the rear wing assembly 16 separately. It is preferably that the rear support 27 is angled between 4 to 31 degrees upward from the frame support 14 where the wing assembly 16 is attached, allowing the gutter guard 10 to be installed on high pitch roofs.

The filter media design being defined and named as pachinko-style filtering media design is a staggered and broken zig-zag style, or a staggered and broken pattern style raised filtering media pattern or shape. This filtering media design is a raised embossing of the screen in pattern(s) or shape(s) and repeats with gaps in between the patterns and shapes that allow water to flow in between the patterns or shapes and then to collide into the raised filtering media staggered design to slow the water and force the water into the filtering media.

There also is another filter media design being defined and named as continuous bead-style filtering media design is a staggered but not broken zig-zag style or a staggered but not broken pattern style raised filtering media pattern or shape. This filtering media design creates focal points forcing the water to slow and go into the filtering media.

The invention claimed is:

1. A gutter guard filtering device for covering the top of a gutter opening comprising:
   a rigid frame support having a front support and a rear support;
   the front support further comprising a front receiver;
   the rear support further comprising a rear receiver;
   a rear wing assembly for attaching to the rigid frame support, the rear wing assembly protruding rearwardly of the rigid frame support a distance for positioning the rear wing assembly beneath a first course of shingles on a roof;
   a mesh filtration screen attached to the rigid frame support by crimping a first edge of the mesh filtration screen in the front receiver and crimping a second edge of the mesh filtration screen in the rear receiver;
   the mesh filtration screen being comprised of a raised embossing of the screen in broken patterns or shapes which patterns or shapes repeat with gaps in between the patterns or shapes, the gaps allowing water to flow in between the broken patterns or shapes wherein raised embossing of the screen in broken patterns or shapes are arranged in a staggered relation to adjacent broken patterns or shapes;
   the raised embossing of the mesh filtration screen in broken patterns or shapes further comprising high points extending to low points, the high points extending to low points facilitating the movement of water and debris from a top to a bottom of the mesh filtration screen.

2. The gutter guard filtering device as recited in claim 1, wherein the receivers of the front support and the rear support have a top leg and a bottom leg for inserting the edges of the mesh filtration screen and crimping the edges of the mesh filtration screen therebetween.

3. The gutter guard filtering device as recited in claim 2, wherein when the front support receiver is crimped upon the mesh filtration screen the top leg protrudes over the mesh filtration screen between ⅛" to ⁷⁄₁₆" beyond the bottom leg.

4. The gutter guard filtering device as recited in claim 2, wherein the rear support further comprises a first receiver for receiving the mesh filtration screen and a second receiver for receiving the rear wing assembly.

5. The gutter guard filtering device as recited in claim 1, wherein the rear support is angled upward from the frame support at the point where the rear wing assembly attaches.

6. The gutter guard filtering device as recited in claim 5, wherein the rear support is angled upward from the frame support from 4 to 31 degrees.

7. The gutter guard filtering device as recited in claim 1, wherein the raised embossing of the screen in broken patterns or shapes which patterns or shapes repeat with gaps in between the patterns or shapes is a zig-zag style extending from left to right across the mesh filtration screen.

8. The gutter guard filtering device as recited in claim 1, wherein the raised embossing of the screen in broken patterns or shapes which patterns or shapes repeat with gaps in between the patterns or shapes is a pattern style extending from left to right across the mesh filtration screen.

9. A gutter guard filtering device for covering the top of a gutter opening comprising:
   a rigid frame support, the rigid frame support further comprising a front support and a rear support, the front support having a front receiver, the rear support having at least one rear receiver, wherein at least one rear receiver of the rear support is upwardly angled from the rigid frame support;
   a rear wing assembly for attaching to the at least one upwardly angled rear receiver, the rear wing assembly adopting an upwardly angled orientation;
   a mesh filtration screen attached to the rigid frame support, the mesh filtration screen being comprised of a raised embossing of the mesh filtration screen creating rows of patterns or shapes with raised edges for contacting a flow of water, the rows of patterns or shapes with raised edges being adjacently arranged in staggered relation upon the mesh filtration screen so that water flow is redirected from side to side as it travels downward across the mesh filtration screen and contacts the raised edges of the rows of patterns or shapes arranged in staggered relation of the mesh filtration screen.

10. The gutter guard filtering device as recited in claim 9, wherein the front and rear receivers have a top leg and a bottom leg for inserting the mesh filtration screen and crimping the mesh filtration screen therebetween.

11. The gutter guard filtering device as recited in claim 10, wherein when the front support receiver is crimped upon the mesh filtration screen the top leg protrudes over the mesh filtration screen between ⅛" to ⁷⁄₁₆" beyond the bottom leg.

12. The gutter guard filtering device as recited in claim 10, wherein the rear support further comprises a first receiver for receiving the mesh filtration screen and a second receiver for receiving the rear wing assembly.

13. The gutter guard filtering device as recited in claim 9, wherein the upwardly angled rear receiver is angled upwardly from the frame support from 4 to 31 degrees.

14. The gutter guard filtering device as recited in claim 9, wherein the raised embossing of the rows of patterns or shapes is an unbroken pattern style extend from left to right across the filtering media.

15. The gutter guard filtering device as recited in claim 9, wherein the raised embossing of the rows of patterns or shapes are broken patterns or shapes which patterns or shapes repeat with gaps in between the patterns or shapes in a zig-zag style which extend from left to right across the filtering media.

16. The gutter guard filtering device as recited in claim 9, wherein the raised embossing of the rows of patterns or shapes are broken patterns or shapes which patterns or shapes repeat with gaps in between the patterns or shapes in a pattern style which extend from left to right across the filtering media.

17. A gutter guard filtering device for covering the top of a gutter opening comprising:
- a rigid frame support, the rigid frame support further comprising a front support and a rear support, the front support having a front receiver, the rear support having at least one rear receiver, wherein at least one rear receiver of the rear support is upwardly angled from the rigid frame support;
- a rear wing assembly for attaching to the at least one upwardly angled rear receiver, the rear wing assembly adopting an upwardly angled orientation;
- a filtering media attached to the front receiver and further attached, to at least one rear receiver, the filtering media being comprised of rows of raised embossing of patterns or shapes extending from left to right on the filtering media which rows of raised embossing of patterns or shapes repeat with focal points in between the raised embossing of patterns or shapes, the focal points allowing water to divert through the filtering media wherein a first row of raised embossing of patterns or shapes lies in a staggered relation to at least a second adjacent row of raised embossing of patterns or shapes;
- each row of raised embossing of patterns or shapes further comprising high points extending downward to the focal points, the high points extending downward to the focal points in a left to right direction across the filtering media.

18. The gutter guard filtering device as recited in claim 17, wherein the raised embossing of patterns or shapes is an unbroken zig-zag style pattern or shape extending from left to right across the filtering media.

19. The gutter guard filtering device as recited in claim 17, wherein the receiver of the front support has a top leg and a bottom leg the top leg protruding over the filtering media between ⅛" to ⁷/₁₆" beyond the bottom leg, the top leg acting to block water from uprising below the filtering media due to surface tension or pushing due to waterflow.

20. The gutter guard filtering device as recited in claim 17, wherein at least one receiver of the rear support attaches the filter media and wherein a second receiver of the rear support attaches the rear wing assembly.

21. The gutter guard filtering device as recited in claim 17, wherein the rear support is angled upward from the frame support at the point where the rear wing assembly attaches.

22. The gutter guard filtering device as recited in claim 21, wherein the rear support is angled upward from the frame support from 4 to 31 degrees.

23. The gutter guard filtering device as recited in claim 17, wherein the raised embossing of patterns or shapes is an unbroken pattern style raised filtering media pattern or shape extending from left to right across the filtering media.

\* \* \* \* \*